March 26, 1968 V. K. CONCANNON 3,375,142
LOW-VOLTAGE DORMANT POWER-SUPPLY APPARATUS
Filed Nov. 26, 1965

INVENTOR.
VIRGIL K. CONCANNON
BY Harry M. Saragovitz,
Edward J. Kelly, Herbert Berl
& S. Dubroff
ATTORNEYS

United States Patent Office 3,375,142
Patented Mar. 26, 1968

3,375,142
LOW-VOLTAGE DORMANT POWER-SUPPLY
APPARATUS
Virgil K. Concannon, 285 Mount Arlington Blvd.,
Landing, N.J. 07850
Filed Nov. 26, 1965, Ser. No. 510,460
2 Claims. (Cl. 136—90)

ABSTRACT OF THE DISCLOSURE

A dormant battery-type power supply unit is provided with a cylindrical casing structure having a cup-shaped bottom section for storing a body of activating electrolyte, an annular intermediate section and a dome-shaped top closure section interconnected and aligned in coaxial relation with each other. A cup-shaped inner cylindrical battery casing or unit holds a plurality of battery cells and is positioned to move longitudinally, from a normal withdrawn position within and coaxial with the intermediate and top sections, into the bottom section and the body of electrolyte to activate the battery. A fluid pressure chamber is provided in the top section and an annular expansion chamber in the intermediate section about the battery unit. Means are provided for applying fluid pressure to the pressure chamber to move the battery unit into the electrolyte which then rises into the expansion chamber and flows through perforations in the sidewall of the unit about the battery cells, thus rapidly activating the battery. The electrolyte body is normally sealed off in the bottom section by the engagement of complementary internal sealing flanges on the intermediate section and the battery unit.

---

The invention described herein may be manufactured and used by or for the Government for governmental purposes without the payment to me of any royalty thereon.

The present invention relates to low-voltage dormant power-supply apparatus of a type adapted for use in portable and mobile electrical equipment on a stand-by basis in readiness for activation when needed.

In certain types of portable and mobile equipment, and in many fixed installations, stand-by readiness for operation must be maintained over long periods of time and this includes the power-supply apparatus particularly, which is often used to trigger certain functional operations of the equipment concerned.

For low-voltage power supply, batteries are often desirable because of their compactness and simplicity of construction. For stand-by use over long periods of time batteries must be maintained in an inactive condition and thus require activation when put to use. However, activation time from an initiating action is generally too long to be practical for many types of electrical apparatus used in modern equipments, particularly for triggering the functioning of certain elements thereof.

It is therefore an object of the present invention to provide an improved low-voltage dormant power-supply apparatus which is capable of long periods of stand-by readiness for operation and which has a relatively short activation time, i.e., the time between initiation and activation of the power source.

It is a further object of this invention to provide an improved low voltage dormant power-supply unit of the battery type with rapid activation capability.

It is also a still further object of this invention to provide an improved liquid type battery supply unit which is adapted for long stand-by periods of readiness and which is rapidly activated upon initiation by the application of fluid pressure thereto. This pressure may be accomplished mechanically, hydraulically, or by electrical means.

In accordance with the invention, a relatively small compact battery unit is provided with a liquid electrolyte such as ammonia, for example, in a chamber into which a battery cell unit or assembly is moved to cause displacement of the electrolyte and expansion into a second chamber to activate the cell units within the battery assembly. Through the use of an improved casing structure and inner movable battery assembly, simplified and rapid inactivation is provided through the application of pressure to a piston-like cell element.

The invention will however be further understood from the following description, when considered with reference to the accompanying drawing, and its scope is pointed out in the appended claims.

Figure 1:
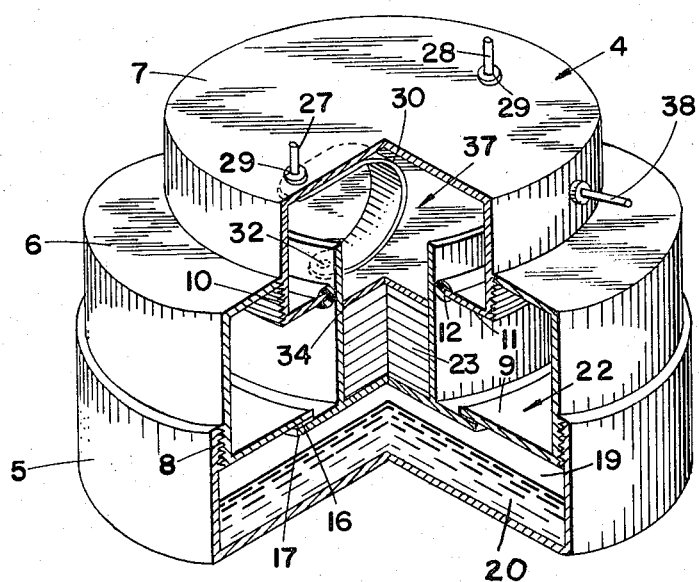
Figure 2:
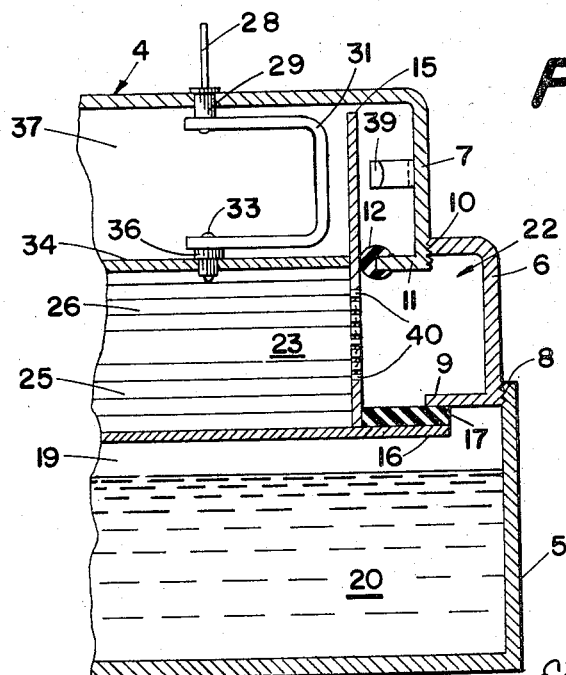

In the drawing FIG. 1 is a view in perspective of a low-voltage dormant power-supply unit in accordance with the invention, with a portion cut away to show the interior of the structure thereof, and FIG. 2 is a fragmentary cross-sectional view, in elevation, of the unit of FIG. 1 showing further details of construction in accordance with the invention and on a somewhat larger scale.

Referring to the drawing, wherein like reference numerals are used to designate like parts throughout, the power-supply unit comprises a relatively-small cylindrical outer casing 4 having three coaxial sections 5, 6 and 7 in stacked relation to each other as indicated. The bottom or base section 5 is of cylindrical cup shape having an upper internally threaded end as indicated at 8 to receive the threaded cylindrical intermediate section 6 therein. This section has a short internal radial flange 9 and is threaded as indicated at 10, to receive the closed top or dome section 7. The latter section likewise has a relatively short radially extending internal flange 11 at its lower end which is also fitted with an annular gasket or ring 12 of resilient sealing material such as rubber, for example.

Coaxial with the outer casing and smoothly fitting the internal diameter of the sealing ring 12 is an internal cylindrical battery carrier or casing 15 of deep cup-shaped construction having a closed bottom end fitted with a radially extending flange 16 on the upper face of which is provided a flat annular gasket or ring 17 of suitable sealing material like the ring 12, and bears against and seals with the internally extending flange element 9. In the normal or dormant position of the battery casing 15 this seals off the lower casing section 5 to provide an electrolyte chamber 19 for holding a body of liquid electrolyte 20 in readiness for use. In the present example this may be liquid ammonia. Likewise between the ring elements 17 and 12 and within the center section 6 of the casing is provided an expansion chamber 22 for the liquid electrolyte as will hereinafter be described.

The battery or battery structure 23 may comprise one or more cells or cell structures 25 and 26 located in the bottom portion of the battery holder 15 as indicated. These are the dry type adapted to be activated upon immersion in the electrolyte 20. The battery is provided with external terminal pins 27 and 28 mounted on the upper or dome section of the casing in suitable insulating gaskets 29. The pins extend internally of the dome or casing and are connected with U-shape flat spring conductors 30 and 31 respectively.

Each of the conductors 30 and 31 is connected with internal battery terminals 32 and 33 respectively which are carried by a closure plate 34 above the battery 23 within the casing 15 and fitted tightly therein as indicated. The terminals 32 and 33 are suitably insulated from the plate 34 by gaskets of insulating material as indicated at 36.

A pressure chamber 37 is formed thus between the plate 34 and the top of the dome or upper casing element 7 to which operating fluid pressure, such as air pressure, may be applied through any suitable connection such as an inlet conduit as indicated at 38 in FIG. 1.

Initiation of pressure into the pressure chamber 37 moves the battery-cell assembly, comprising the casing 15, the battery 23, the plate 34 and the gasket 17, downwardly against the holding force of the spring elements 31 and 30 into the liquid electrolyte 20 in the chamber 19. During this movement the seal created by the gasket 17 is broken allowing liquid electrolyte to rise into the expansion chamber 22 by the displacement of the electrolyte as the cell or battery holder reaches the lower portion of the bottom section 5 of the casing. A guide spring 39 within the casing section 7 serves to guide the casing 15 and to hold the battery assembly in the lowest activated position within the chamber 19. The terminal strap or strip connectors 30 and 31 are extended and retain the connections between the battery cell assembly and the terminals 27 and 28, at the same time exerting an upward biasing force on the cell holder.

The electrolyte is permitted to flow into the battery cells through a porous or perforated area of the battery casing or cell holder 15 as provided by perforated openings indicated at 40 in FIG. 2. These holes or openings may be relatively small and extend fully around the entire periphery of the casing 15 in a band surrounding the battery cells. Electrochemical action occurs at this time and electric charge is generated and applied to the output terminals 27 and 28 for instant use. The battery assembly may be moved by other than fluid pressure, as by a plunger in electrically actuated devices or the like or any similar means for applying direct downward pressure on the assembly to move it into the electrolyte chamber and break the seal for expansion of the electrolyte into the expansion chamber and hence quickly into the battery structure for activating the cells thereof.

This construction thus provides a reliable, low-cost battery power-supply unit which is rapidly activated in such a relatively short time that its possibilties for other applications are extended. Such applications being for test triggering a functional operation on a precise timing basis for example. During the dormant period the battery elements are entirely separated and completely isolated by the barrier sealed by a relatively large gasket means under pressure. The device is thus in readiness for instant use over prolonged periods of operation in an active standby condition. Thus an improved unit of the battery type is adapted for rapid activation following initiation of the activation by the application of pressure or the like to the internal elements of the unit. The voltage output may be determined by the number of cells placed in the chamber and connected in any desired manner, such as serially for example.

I claim:

1. A dormant battery-type power supply unit, comprising in combination, a cylindrical outer casing having a cup-shaped bottom section, a cylindrical intermediate section and closed dome-shaped top section interconnected to close said casing, said top and intermediate sections having relatively-short radially-extending inner flange elements, an inner cylindrical and axially-movable piston-like battery casing, a plurality of inactive battery cells in said casing, means providing a sealing contact between said battery casing and said flange elements to seal-off said outer casing into an electrolyte chamber in the bottom section thereof and two additional chambers comprising an expansion chamber surrounding said battery casing in the intermediate section thereof and a pressure chamber in the top section thereof, spring terminal means for the battery cells connected between said top section and said inner battery casing to bias said battery casing into sealing contact with the flange elements, a portion of the battery casing within the expansion chamber being perforated to admit electrolyte therethrough to activate the battery cells upon immersion in said electrolyte, and means for applying fluid pressure to said pressure chamber to move said battery casing against said biasing action to effect said immersion and activation of said battery cells.

2. A dormant battery-type instant power supply unit comprising in combination, a composite cylindrical outer casing structure having a cup-shaped base section for storing a charge of activating electrolyte with an annular intermediate section and a dome-shaped top closure section interconnected therewith all separable one from the other and aligned in coaxial relation with each other, a cup-shaped longitudinally-movable inner cylindrical battery casing in a normal position withdrawn from said base section and electrolyte charge within and coaxial with the intermediate and top sections, said inner battery casing being cooperatively related to the intermediate and top sections to provide releasable sealing means between said casing sections and thereby to provide an electrolyte expansion chamber in the intermediate section and surrounding the battery casing and pressure chamber in the top section, means for applying fluid pressure to said pressure chamber to move said battery casing axially into the base section and to unseal said sections and displace the electrolyte charge into the intermediate section and expansion chamber, a plurality of battery cells in said inner cylindrical battery casing, battery terminal spring elements connected between said top section and said inner cylindrical casing for resiliently holding said casing in said withdrawn position, and means for admitting electrolyte to flow into said battery casing and the battery elements therein from said expansion chamber in response to immersion of said casing in said electrolyte, thereby to activate said battery unit for operation.

References Cited

UNITED STATES PATENTS

| 3,053,928 | 9/1962 | Hopkins | 136—90 |
| 3,075,034 | 1/1963 | Doyen | 136—90 |
| 3,235,408 | 2/1966 | Harris | 136—90 |

ALLEN B. CURTIS, *Primary Examiner.*

WINSTON A. DOUGLAS, *Examiner.*

C. F. LE FEVOUR, *Assistant Examiner.*